(No Model.)
W. D. RUMSEY.
VEHICLE SPRING.
No. 255,461. Patented Mar. 28, 1882.
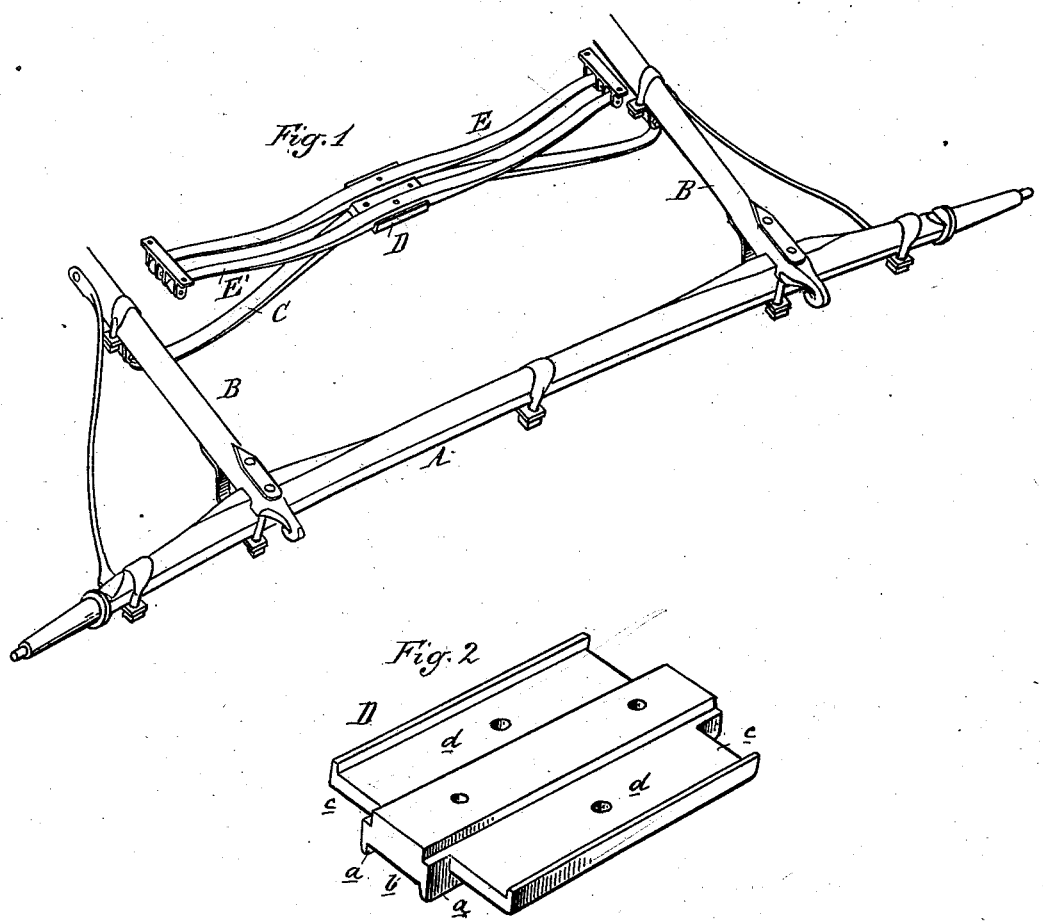
Attest:
A. Barthel
E. Scully.
Inventor.
William D. Rumsey
per Phil. S. Sprague
Att'y

UNITED STATES PATENT OFFICE.

WILLIAM D. RUMSEY, OF DETROIT, MICHIGAN.

VEHICLE-SPRING.

SPECIFICATION forming part of Letters Patent No. 255,461, dated March 28, 1882.

Application filed January 26, 1882. (No model.)

*To all whom it may concern:*

Be it known that I, WILLIAM D. RUMSEY, of Detroit, in the county of Wayne and State of Michigan, have invented new and useful Improvements in Side-Bar Spring-Wagons; and I do hereby declare that the following is a full, clear, and exact description thereof, reference being had to the accompanying drawings, which form a part of this specification, and in which—

Figure 1 represents a perspective view of a spring provided with my improved connecting-plate, and Fig. 2 a detail perspective view of the connecting-plate.

The nature of this invention relates to certain new and useful improvements in side-bar spring-wagons of that class which is provided with transverse springs. In such wagons the semi-elliptic springs are secured at each end to the side bars, and another spring is secured by bolts or clips to and above the center of the first-named spring, and the body of the vehicle rests upon the upturned ends of the upper spring. The method usually adopted to secure the upper spring to the lower is such that the upper soon, in use, begins to wear loose and allow too much lateral rock to the body.

The object of my invention is to prevent this and give the upper spring a firmer bearing upon the lower.

The invention consists in the peculiar construction of parts, and their combination, as more fully hereinafter set forth.

In the accompanying drawings, A represents a wagon-axle, B B the side bars thereto attached, and C the transverse spring attached to the side bars, all constructed and attached together in the usual or any of the known ways.

D is a plate of iron, with its under surface provided with downwardly-projecting ledges *a*, within which is a longitudinal recess, *b*, designed to embrace the spring C, to which the plate is secured by two or more bolts or rivets. Projecting on either side are wings *c*, with the recesses *d*, one of which embraces one of the upper springs, E, and the other the spring E', which are secured in said recesses by bolts or rivets.

It will readily be seen that if but a single upper spring be desired the plate D should be provided with the recess *b* on its lower side, and with one recess, *d*, in the upper side of such plate, and this may be done without departing from the spirit of my invention.

By this construction it will be observed that I prevent the turning of the spring upon a single bolt as a pivot without weakening the spring by more than one bolt-hole, the flanges above and below affording an ample bearing for that purpose.

What I claim as my invention is—

1. The plate D, having central recess, *b*, formed by the flanges *a* upon its lower surface, and the side wings, *c*, having recesses formed by the outer flanges and raised central portion, adapted to serve with a single lower spring and duplex upper springs, as and for the purpose specified.

2. The plate D, having recess *b* and recessed wings *c*, flanges *a*, side flanges, and raised center, combined with the upper spring, E and E', the lower springs, C, and securing means, substantially as set forth.

WILLIAM D. RUMSEY.

Witnesses:
 H. S. SPRAGUE,
 E. SCULLY.